United States Patent
Milanfar et al.

(10) Patent No.: US 7,379,612 B2
(45) Date of Patent: May 27, 2008

(54) DYNAMIC RECONSTRUCTION OF HIGH-RESOLUTION VIDEO FROM COLOR-FILTERED LOW-RESOLUTION VIDEO-TO-VIDEO SUPER-RESOLUTION

(75) Inventors: Peyman Milanfar, Menlo Park, CA (US); Sina Farsiu, Santa Cruz, CA (US); Michael Elad, Haifa (IL)

(73) Assignee: The Regents of the University of California, Santa Cruz, Oakland, CA (US)

( * ) Notice: Subject to any disclaimer, the term of this patent is extended or adjusted under 35 U.S.C. 154(b) by 70 days.

(21) Appl. No.: 11/584,400

(22) Filed: Oct. 19, 2006

(65) Prior Publication Data

US 2007/0071362 A1    Mar. 29, 2007

(51) Int. Cl.
  *G06K 9/40* (2006.01)
(52) U.S. Cl. ............... 382/254; 382/167; 382/169; 382/299
(58) Field of Classification Search ............. 382/167, 382/169, 255, 260, 284, 294, 299; 348/241, 348/254; 358/1.2, 3.26, 3.27
See application file for complete search history.

(56) References Cited

U.S. PATENT DOCUMENTS 5,995,457 A * 11/1999 Jamail .................. 369/30.04
6,381,179 B1 * 4/2002 Derhacobian et al. . 365/185.29
6,542,925 B2 * 4/2003 Brown et al. ............... 709/208
6,640,145 B2 * 10/2003 Hoffberg et al. ............. 700/83
6,847,391 B1 * 1/2005 Kassatly .................. 348/14.01

OTHER PUBLICATIONS

Elad, Michael and Hel-Or, Yacov "A Fast Super-Resolution Reconstruction Algorithm for Pure Translational Motion and Common Space-Invariant Blur" (2001) IEEE Transactions on Image Processing vol. 10 No. 8 pp. 1187-1193.
Elad, Michael and Feuer, Arie "Superresolution Restoration of an Image Sequence: Adaptive Filtering Approach" (1999) IEEE Transactions on Image Processing vol. 8 No. 3 pp. 387-395.
Elad, Michael and Feuer, Arie "Super-Resolution Reconstruction of Image Sequences" (1999) IEEE Transactions on Patter Analysis and Machine Intelligence vol. 21 No. 9 pp. 817-834.

* cited by examiner

*Primary Examiner*—Yosef Kassa
(74) *Attorney, Agent, or Firm*—Lumen Patent Firm, Inc.

(57) ABSTRACT

A method is provided of solving the dynamic super-resolution (SR) problem of reconstructing a high-quality set of monochromatic or color superresolved images from low-quality monochromatic, color, or mosaiced frames. The invention includes a joint method for simultaneous SR, deblurring, and demosaicing, this way taking into account practical color measurements encountered in video sequences. For the case of translational motion and common space-invariant blur, the proposed invention is based on a very fast and memory efficient approximation of the Kalman filter (KF). Experimental results on both simulated and real data are supplied, demonstrating the invention algorithms, and their strength.

5 Claims, 6 Drawing Sheets

(a)

(b)

(c)

(d)

(e)

(f)

(g)

(h)

DYNAMIC RECONSTRUCTION OF HIGH-RESOLUTION VIDEO FROM COLOR-FILTERED LOW-RESOLUTION VIDEO-TO-VIDEO SUPER-RESOLUTION

STATEMENT REGARDING FEDERALLY SPONSORED RESEARCH OR DEVELOPMENT

The present invention was supported in part by grant number CCR-9984246 and F49620-03-01-0387 from the National Science Foundation and U.S. Air Force. The U.S. Government has certain rights in the invention.

CROSS-REFERENCE TO RELATED APPLICATIONS

This application is cross-referenced to and claims the benefit from U.S. patent application Ser. No. 11/301,817 filed Dec. 12, 2005, which claims benefit of U.S. Provisional Application 60/637,058 filed Dec. 16, 2004, and which are hereby incorporated by reference.

FIELD OF THE INVENTION

The invention relates generally to image processing. More particularly, the invention relates to reconstructing a high-quality set of monochromatic or color super-resolved images from a low-quality set of monochromatic, color or mosaiced frames.

BACKGROUND

Theoretical and practical limitations usually constrain the achievable resolution of any imaging device. While higher quality images may result from more expensive imaging systems, often it is desirable to increase the resolution of images previously captured under non-ideal situations. For instance, enhancing the quality of a video sequence captured by surveillance cameras in a crime scene is an example of these situations. The basic idea behind super-resolution is the fusion of a sequence of low-resolution noisy blurred images to produce a higher-resolution image. Early works on super-resolution showed that it is the aliasing effects in the low-resolution images that enable the recovery of the high-resolution fused image, provided that a relative sub-pixel motion exists between the undersampled input images. In contrast to the clean but practically naive frequency-domain description of super-resolution proposed in the early works on this subject, in general, super-resolution is a computationally complex and numerically ill-posed problem in many instances. In recent years, more sophisticated super-resolution methods have been developed.

Previous approaches have used super-resolution applied on an image sequence, producing a sequence of super-resolution images. At time point t, a super-resolution result is desired that fuses the causal images at times t, t−1, . . . , 1. The approaches were to apply the regular super-resolution on this set of images with the $t^{th}$ frame as a reference, produce the super-resolution output, and repeat this process all over again per each temporal point. This is referred to as the static super-resolution method, since it does not exploit the temporal evolution of the process. The memory and computational requirements for the static process are so taxing as to preclude its direct application to the dynamic case, without highly efficient algorithms.

Previous work on applications to the dynamic case have relied on the information pair to approximate the Kalman filter, but have proved to be computationally expensive.

Previous work considered a causal mode of operation, where the output image at time $t_0$ fuses the information from times $t \leq t_0$. This is the appropriate mode of operation when online processing is considered however is not capable of providing optimum image enhancement in non-causal modes of operation.

What is needed is a computationally less complex than the dynamic super-resolution methods, and a means to decompose this problem into two disjoint pieces, without sacrificing quality.

Further, what is needed is a method of simultaneously addressing two common resolution-enhancement problems in digital video/photography that are typically addressed separately, namely, super-resolution and demosaicing. A method is needed for a dynamic super-resolution algorithm for both monochromatic and color input and output sequences.

Improvements are needed in both visual quality (resolution enhancement and color artifact reduction) and computational/memory efficiency. And finally, a non-causal processing mode is needed, where every high-resolution reconstructed image is derived as an optimal estimate incorporating information from all the frames in the sequence.

SUMMARY OF THE INVENTION

The current invention adopts a dynamic point of view in developing the new super-resolution solution. For time t the current invention uses the solution at the previous time instant as a stepping stone towards a faster and more reliable super-resolution solution. This is the essence of how dynamic super-resolution is to gain its speed and better results, as compared to a sequence of detached static super-resolution solutions.

One aspect of the current invention uses a mean-covariance approach, which is computationally less complex than the dynamic super-resolution methods proposed previously. For the case of translational motion and common space-invariant blur, this problem can be decomposed into two disjoint pieces, without sacrificing optimality, while for the more complex motion and blur models it is still a reliable but suboptimal approximation.

One aspect of the invention focuses on two common resolution-enhancement problems in digital video/photography that are typically addressed separately, namely, super-resolution and demosaicing. While super-resolution is naturally described for monochrome images, aiming to increase resolution by the fusion of several frames, demosaicing is meant to recover missing color values, decimated deliberately by the sensor. In the current invention a method is provided of dealing with these two problems jointly, and dynamically.

The current invention provides a dynamic super-resolution algorithm for both monochromatic and color input and output sequences. Improvements are demonstrated in both visual quality (resolution enhancement and color artifact reduction) and computational/memory efficiency. Advanced priors are introduced that handle both spatial and color-wise relationships properly, this way leading to high quality recovery.

A noncausal processing mode is provided, where every high-resolution reconstructed image is derived as an optimal estimate incorporating information from all the frames in the sequence. This is an appropriate mode of operation for offline processing of movies, stored on disk, where a smoothed Kalman filter is used to obtain an efficient algorithm for this case.

The current invention is a method of video-to-video dynamic super-resolution for reducing memory requirements and enhancing processing speed, color and resolution for grayscale and color sequences. The method uses super-resolution, deblurring, and demosaicing simultaneously to incorporate color measurements encountered in video sequences. Further, this method uses a pixel-wise mean-covariance approximate of a Kalman filter for an optimal pilot fused image on a high resolution grid. Additionally, the invention applies advanced priors to both spatial and color-wise relationships for high quality recovery. And, the method of the current invention uses a non-causal process mode, where each pilot fused image is derived as an optimal estimate incorporating information from all frames in a sequence using the smoothed approximated pixelwise Kalman filter to obtain an efficient algorithm.

In one aspect of the invention, a diagonal covariant matrix is applied to the approximated Kalman filter for enhanced processing speed.

In one aspect of the invention, the data fusion includes causally estimating a state vector at time ($t \geq 1$) from a low-resolution frame at time ($t \geq 1$), choosing a high-resolution frame at time ($t=0$) and the covariance matrix at time ($t=0$)=$\epsilon^2 I$, thus ensuring the covariance matrix at time (t) is strictly positive definite at all times, obtaining a low-resolution input image by setting $t=t+1$, applying a motion compensation by computing a forward-shifted matrix at time (t) and a forward shifted covariance matrix at time (t), updating said covariance matrix at time (t), and updating said state vector at time (t). repeating steps for obtaining a low-resolution input image.

In one aspect of the invention, the image interpolation, deblurring, and demosaicing includes using a data fidelity penalty term, where the data fidelity penalty term is an L2 norm penalty term to enforce similarities between said pilot fused image and a high-resolution image estimate, using a spatial luminance penalty term, where the spatial luminance penalty term is a penalty term to encourage sharp edges in a luminance component to said high-resolution image, using a spatial chrominance penalty term, where the spatial chrominance penalty term is a term to encourage smoothness in a chrominance component of said high-resolution image, and using an inter-color dependencies penalty term, where the inter-color dependencies penalty term is a term to encourage homogeneity of an edge location and orientation in different color bands.

In one aspect of the invention, the lower-resolution color images include color filtered images, compressed color images, compressed color filtered images, and an image sequence with color artifacts.

End with mentioning some key advantages of the invention

BRIEF DESCRIPTION OF THE FIGURES

The objectives and advantages of the present invention will be understood by reading the following detailed description in conjunction with the drawing, in which.

DETAILED DESCRIPTION OF THE INVENTION

Figures 1, 2:
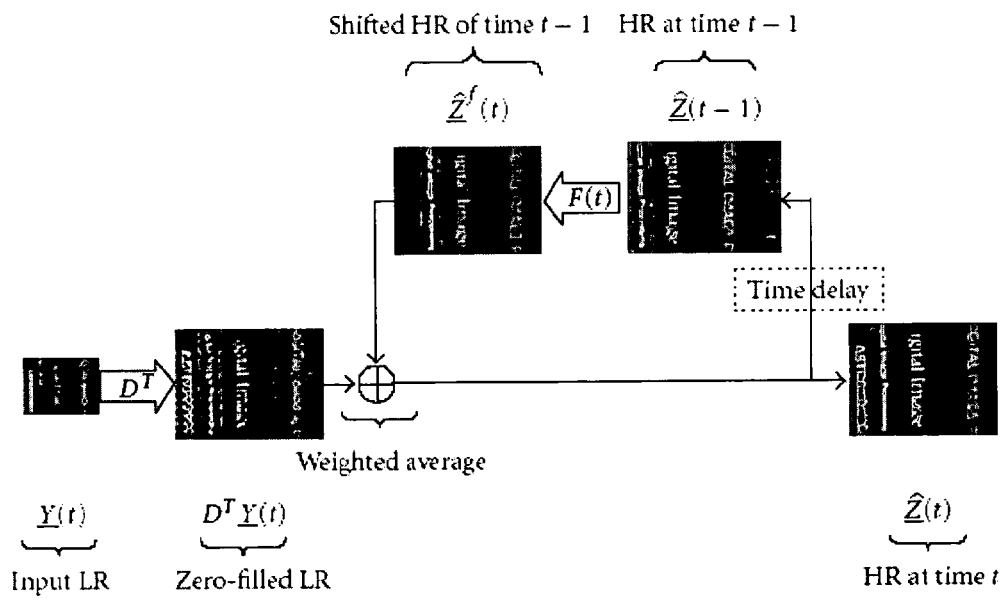
FIG. 1 shows the results of applying an upsampling operation ($D^T G_S D$) on an arbitrary diagonal matrix.
FIG. 2 shows a block diagram representation of the method of obtaining a new optimal pilot fused image for use as an input frame for deblurring and interpolation operation according to the present invention.

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

The current invention provides algorithms to enhance the quality of a set of noisy, blurred, and possibly color-filtered images to produce a set of monochromatic or color high-resolution images with less noise, aliasing, and blur effects. A MAP estimation technique is used to derive a hybrid method of dynamic super-resolution and multiframe demosaicing. Our method is also applicable to the case of color super-resolution.

For the case of translational motion and common space-invariant motion, a two-step algorithm is justified, which is also directly applicable for more complex motion and blur models. In the first step, a Kalman filter framework is used for fusing low-resolution images recursively in a fast and memory-efficient way, where the lower-resolution color images include color filtered images, compressed color images, compressed color filtered images, and an image sequence with color artifacts. In the second step, while deblurring and interpolating the missing values, luminance and color artifacts are reduced by using appropriate penalty terms. These terms were based on prior knowledge of the statistics of natural images and the properties of the human visual system. All matrix-vector operations in the proposed method are implemented as simple image operators.

In the current invention, a general linear dynamic forward model for the super-resolution problem is used. A dynamic scene with intensity distribution X(t) is seen to be warped at the camera lens because of the relative motion between the scene and camera, and blurred by camera lens and sensor integration. Then, it is discretized at the CCD, resulting in a digitized noisy frame Y(t). Discretization in many commercial digital cameras is a combination of color filtering and downsampling processes. However, here the treatment is restricted to simple monochrome imaging for discussion purposes. This forward model is represented by the following state-space equations $$X(t)=F(t)X(t-1)+U(t)$$

$$Y(t)=D(t)H(t)X(t)+W(t)$$

The equations given above describe a system in its statespace form, where X(t) describes how the ideal super-resolved images relate to each other through time. The underscore notation, such as $\underline{X}$, is used to indicate a vector derived from the corresponding image of size $[rQ_1 \times rQ_2]$ pixels, scanned in lexicographic order. The current image X(t) is of size $[r^2Q_1Q_2 \times 1]$, where r is the resolution-enhancement factor, and $[Q_1 \times Q_2]$ is the size of an input low-resolution image. The equation above for X(t) states that up to some innovation content U(t), the current high-resolution image is a geometrically warped version of the previous image, X(t−1). The $[r^2Q_1Q_2 \times r^2Q_1Q_2]$ matrix F(t) represents this warp operator. The so-called system noise U(t), of size $[r^2Q_1Q_2 \times 1]$, is assumed to be additive zero-mean Gaussian with $C_u(t)$ as its covariance matrix of size $[r^2Q_1Q_2 \times r^2Q_1Q_2]$. Note that the closer the overlapping regions of X(t) and the motion compensated X(t−1) are, the smaller $C_u(t)$ becomes. Therefore, $C_u(t)$ reflects the accuracy of the motion estimation process and for overlapped regions it is directly related to the motion estimation covariance matrix.

As to the equation for Y(t) above, it describes how the measured image Y(t) of size $[Q_1Q_2 \times 1]$ is related to the ideal one, X(t). The camera's point spread function (PSF) is modeled by the $[r^2Q_1Q_2 \times r^2Q_1Q_2]$ blur matrix H(t), while the $[Q_1Q_2 \times r^2Q_1Q_2]$ matrix D(t) represents the downsampling operation at the CCD (downsampling by the factor r in each axis). In mosaiced cameras, this matrix also represents the effects of the color filter array, which further downsamples the color images. The noise vector W(t) of size $[Q_1Q_2 \times 1]$ is assumed to be additive, zero-mean, white Gaussian noise. Thus, its $[Q_1Q_2 \times Q_1Q_2]$ covariance matrix is $C_w(t)=\sigma_w^2 I$. It is further assumed that U(t) and W(t) are independent of each other.

The equations given above describe a system in its state space form, where the state is the desired ideal image. Thus, a Kalman filter formulation can be employed to recursively compute the optimal estimates (X(t), t∈{1, ..., N}) from the measurements (Y(t), t∈{1, ..., N}), assuming that D(t), H(t), F(t), $\sigma_w$, and $C_u(t)$ are all known. This estimate could be done causally, as an online processing of an incoming sequence, or noncausally, assuming that the entire image sequence is stored on disk and processed offline.

As to the assumption about the knowledge of various components of the current invention, while each of the operators D(t), H(t), and F(t) may vary in time, for most situations the downsampling (and later color filtering), and camera blurring operations remain constant over time assuming that the images are obtained from the same camera. In the current invention, we initially assume that the camera PSF is space-invariant, and the motion is composed of pure translations, accounting for either vibrations of a gazing camera, or a panning motion of a faraway scene. Thus, both H and F(t) are block-circulant matrices, and as such, they commute. It is assumed that H is known, being dependent on the camera used, and F(t) is built from motion estimation applied on the raw sequence Y(t). The downsampling operator D is completely dictated by the choice of the resolution-enhancement factor (r). As to $\sigma_w$, and $C_u(t)$, those will be handled shortly.

By substituting Z(t)=HX(t) when using X(t)=F(t)X(t−1)+U(t), and Y(t)=D(t)H(t)X(t)+W(t), an alternative model is obtained, where the state vector is Z(t), $$Z(t)=F(t)Z(t-1)+V(t),$$

$$Y(t)=DZ(t)+W(t).$$

Note that for Z(t) here is obtained by left multiplication of both sides of X(t) by H and using the fact that it commutes with F(t). Thus, the vector V(t) is a colored version of U(t), leading to $C_v(t)=HC_u(t)H^T$ as the covariance matrix.

With this alternative definition of the state of the dynamic system, the solution of the inverse problem at hand decomposes, without loss of optimality, into the much simpler subtasks of fusing the available images to compute the estimated blurry image $\hat{Z}(t)$, followed by a deblurring/interpolation step, estimating $\hat{X}(t)$ from $\hat{Z}(t)$. Here, the three color bands are treated separately. For instance, only the red band values in the input frames, Y(t), contribute to the reconstruction of the red band values in $\hat{Z}(t)$. The correlation of the different color bands is discussed and exploited further below.

The application of Kalman filter to estimate an optimal pilot fused image Z(t) on a high resolution grid, in general, requires the update of the state vector's covariance matrix per each temporal point, and this update requires an inversion of the state vector's covariance matrix. For a superresolved image with $r^2Q_1Q_2$ pixels, this matrix is of size $[r^2Q_1Q_2 \times r^2Q_1Q_2]$, implying a prohibitive amount of computations and memory.

The current invention achieves significant speedups for the case of translational motion and common space-invariant blur. More specifically, the current invention is a method of video-to-video dynamic super-resolution for reducing memory requirements and enhancing processing speed, color and resolution for grayscale and color sequences. The method uses super-resolution, deblurring, and demosaicing simultaneously to incorporate color measurements encountered in video sequences. Further, this method uses a pixel-wise mean-covariance approximate of a Kalman filter for an optimal pilot fused image on a high resolution grid. Additionally, the invention applies advanced priors to both spatial and color-wise relationships for high quality recovery. And, the method of the current invention uses a non-causal process mode, where each pilot fused image is derived as an optimal estimate incorporating information from all frames in a sequence using the smoothed approximated pixelwise Kalman filter to obtain an efficient algorithm. A more detailed description of the invention is now provided.

The following defines the forward Kalman propagation and update equations that account for a causal (online) process, and more specifically the following describes a method of using a pixel-wise mean-covariance approximate of a Kalman filter for an optimal pilot fused image on a high resolution grid. It is assumed that at time t−1 there exists the mean-covariance pair, ($\hat{Z}(t-1)$, $\tilde{M}(t-1)$), and those should be updated to account for the information obtained at time t. Beginning with the covariance matrix update based on Z(t)=F(t)Z(t−1)+V(t), $$\tilde{M}(t)=F(t)\tilde{M}(t-1)F^T(t)+C_v(t)$$

The Kalman filter gain matrix is given by $$K(t)=\tilde{M}(t)D^T[C_w(t)+D\tilde{M}(t)D^T]^{-1}$$

This matrix is rectangular of size $[r^2Q_1Q_2 \times Q_1Q_2]$. Based on K(t), the updated state-vector mean is computed by $$\hat{Z}(t)=F(t)\hat{Z}(t-1)+K(t)[Y(t)-DF(t)\hat{Z}(t-1)]$$

The final stage requires the update of the covariance matrix, based on Y(t)=D Z(t)+W(t), $$\hat{M}(t)=Cov(\hat{Z}(t))=[I-K(t)D]\tilde{M}(t)$$

While in general the above equations require the propagation of intolerably large matrices in time, referring to $C_v(t)$ as a diagonal matrix, then $\tilde{M}(t)$ and $\hat{M}(t)$ are diagonal matrices of size $[r^2Q_1Q_2 \times r^2Q_1Q_2]$. It is relatively easy to verify this property: for an arbitrary diagonal matrix $G_B$ (B stands for big), the matrix $DG_BD^T$ is a diagonal matrix. Similarly, for an arbitrary diagonal matrix $G_S$ (S stands for small), the matrix $D^TG_SD$ is diagonal as well. Also, it is known that for an arbitrary translation matrix F and an arbitrary diagonal matrix $G_B$, the matrix $FG_BF^T$ is diagonal. Therefore, if the matrix $\hat{M}(0)$ is initialized as a diagonal matrix, then $\tilde{M}(t)$ and $\hat{M}(t)$ are necessarily diagonal for all t, being the results of summation, multiplication, and inversions of diagonal matrices. Diagonality of $C_v(t)$ is a key assumption in transferring the general Kalman filter into a simple and fast procedure. Choosing a matrix $\sigma_v^2 I \geq C_v(t)$, it implies that $\sigma_v^2 I - C_v(t)$ is a positive semidefinite matrix, and there is always a finite $\sigma_v$ that satisfies this requirement. Replacing $C_v(t)$ with this majorizing diagonal matrix, the new state-space system in $$Z(t)=F(t)Z(t-1)+V(t), \text{ and}$$

$$Y(t)=DZ(t)+W(t)$$

simply assumes a stronger innovation process. The effect on the Kalman filter is to rely less on the temporal relation in $Z(t)=F(t) Z(t-1)+V(t)$ and more on the measurements in $Y(t)=DZ(t)+W(t)$. In fact, at the extreme case, if $\sigma_v \to \infty$, the Kalman filter uses only the measurements, leading to an intraframe maximum likelihood estimator. Thus, more generally, such a change causes a loss in the accuracy of the Kalman filter because it relies less on the internal dynamics of the system, but this comes with a welcomed simplification of the recursive estimator. It must be clear that such change in $C_v(t)$ has no impact on the convergence properties of the dynamic estimator applied, and it does not introduce a bias in the estimate. Note that all the above is true also for a diagonal non-Toeplitz alternative, where the main diagonal entries are varying in space.

Once $C_v(t)$ is chosen to be diagonal, $$\tilde{M}(t)=F(t)\hat{M}(t-1)F^T(t)+C_v(t),$$

$$K(t)=\tilde{M}(t)D^T[C_w(t)+D\tilde{M}(t)D^T]^{-1},$$

$$\hat{Z}(t)=F(t)\hat{Z}(t-1)+K(t)[Y(t)-DF(t)\hat{Z}(t-1)], \text{ and}$$

$$\hat{M}(t)=Cov(\hat{Z}(t))=[I-K(t)D]\tilde{M}(t)$$

are simplified, and their use is better understood on a pixel-by-pixel (pixelwise) basis. Some notations are introduced here to simplify the explanation of the process.

The warp matrix F(t) and its transpose can be exactly interpreted as image shift operators. Hereafter the superscript "f" is used to simplify the notation of forward shifting of vectors and diagonal matrices, and thus $Z^f(t)=F(t)Z(t-1)$ and $\hat{M}^f(t)=F(t)\hat{M}(t-1)F^T(t)$.

Also, the matrix D and its transpose can be exactly interpreted as downsampling and upsampling operators. Application of D Z(t) and $D\hat{M}(t)D^T$ results in downsampling of the vector Z(t) and the diagonal matrix $\hat{M}(t)$. Likewise, application of $D^TY(t)$ and $D^TC_w(t)D$ results in upsampling of the vector Y(t) and the diagonal matrix $C_w(t)$ with zero filling. FIG. 1 illustrates the effect of matrix upsampling and downsampling operations, and this also sheds some light on the previous discussion on the diagonality assumption on $\tilde{M}(t)$ and $\hat{M}(t)$. As shown, the diagonal matrix $G_B$ on the right of FIG. 1 is the result of applying the upsampling operation ($D^TG_SD$) on an arbitrary diagonal matrix $G_S$ on the left. The matrix $G_S$ can be retrieved by applying the downsampling operation ($DG_BD^T$). The upsampling/downsampling factor for this example is two.

Finally, the notation $[G]_q$ is used to refer to the (q, q) entry of the diagonal matrix G, and $[\underline{G}]_q$ to refer to the (q, 1) entry in the vector G. This way both the low-resolution and the high-resolution grids can be handled in the same equations.

Returning now to the Kalman filter equations to show how they are implemented in practice on a pixel-by-pixel basis. First, referring to the propagated covariance matrix, observing that in $K(t)=\tilde{M}(t)D^T[C_w(t)+D\tilde{M}(t)D^T]^{-1}$, the term $C_w(t)+D\tilde{M}D^T$ is a diagonal matrix of size $[Q_1Q_2 \times Q_1Q_2]$, with the (q, q)th entry being $$[C_w(t)]_q+[\hat{M}^f(t)]_{qr^2}+[C_v(t)]_{qr^2}$$

with q in the range $[1, Q_1Q_2]$. The "jumps" in $r^2$ in the indices of $\hat{M}^f(t)$ and $C_v(t)$ are caused by the decimation D. Applying an inversion replaces the above by its reciprocal. Using interpolation $D^T(C_w(t)+D\tilde{M}D^T)^{-1}D$ gives a diagonal matrix of size $[r^2Q_1Q_2 \times r^2Q_1Q_2]$, with the qth entry being $$\frac{1}{[C_w(t)]_{q/r^2} + [\hat{M}^f(t)]_q + [C_v(t)]_q}$$

this time referring to the indices $q=r^2, 2r^2, \ldots, r^2Q_1Q_2$. For all other $(r^2-1)Q_1Q_2$ indices, the entries are simply zeros, filled by the interpolation. Merging this with $K(t)=\tilde{M}(t)D^T[C_w(t)+D\tilde{M}(t)D^T]^{-1}$ and $\hat{M}(t)=Cov(\hat{Z}(t))=[I-K(t)D]\tilde{M}(t)$, gives $$[\hat{M}(t)]_q = \begin{cases} \dfrac{[C_w(t)]_{q/r^2}([\hat{M}^f(t)]_q + [C_v(t)]_q)}{[C_w(t)]_{q/r^2}[\hat{M}^f(t)]_q + [C_v(t)]_q} \\ \quad \text{for } q = r^2, 2r^2, \ldots, Q_1Q_2r^2 \\ [\hat{M}^f(t)]_q + [C_v(t)]_q \quad \text{otherwise.} \end{cases}$$

Note that the incorporation of each newly measured low-resolution image only updates values of $Q_1Q_2$ entries in the diagonal of $\hat{M}(t)$, located at the $[r^2, 2r^2, \ldots, r^2Q_1Q_2]$ positions. The remaining $(r^2-1)Q_1Q_2$ diagonal entries are simply propagated from the previous temporal point, based on $\tilde{M}(t)=F(t)\hat{M}(t-1)F^T(t)+C_v(t)$ only. The same effect holds true for the update of $\hat{Z}(t)$, where $(r^2-1)Q_1Q_2$ entries are propagated from the previous temporal point without an update. Turning to the update of the mean vector, $\hat{Z}(t)$, using the same reasoning applied on $$K(t)=\tilde{M}(t)D^T[C_w(t)+D\tilde{M}(t)D^T]^{-1}$$

and $$\hat{Z}(t)=F(t)\hat{Z}(t-1)+K(t)[Y(t)-DF(t)\hat{Z}(t-1)],$$

the following relation is obtained $$[\hat{Z}^f(t)]_q = \begin{cases} \dfrac{[C_w(t)]_{q/r^2}[\hat{Z}^f(t)]_q + ([\hat{M}^f(t)]_q + [C_v(t)]_q)[\underline{Y}(t)]_{q/r^2}}{[C_w(t)]_{q/r^2} + [\hat{M}^f(t)]_q + [C_v(t)]_q} \\ \text{for } q = r^2, 2r^2, \ldots, Q_1 Q_2 r^2, \\ [\hat{Z}^f(t)]_q \text{ otherwise.} \end{cases}$$

where $[\hat{Z}(t)]_q$ is an optimal pilot fused image on a high resolution grid. FIG. 2 describes the above equation's upper part as a block diagram, where $\hat{Z}(t)$, the new input HR output frame, or pilot fused image, is the weighted average of Y(t), the current input LR frame, and $\hat{Z}^f(t)$, the previous estimate of the HR image after motion compensation. Notice that two images are merged here—an interpolated version of Y(t) and $\hat{Z}^f(t)$. The merging is done as a weighted average between the two, as the figure suggests. The overall procedure using these update equations is outlined here in Algorithm 1.

---

ALGORITHM 1: Forward dynamic shift-and-add algorithm.

(i) Task. Given $\{\underline{Y}(t)\}_{t \geq 1}$, estimate $\{\underline{Z}(t)\}_{t \geq 1}$ causally.
(ii) Initialization. Set t = 0, choose $\underline{\hat{Z}}(t) = 0$ and $\hat{M}(t) = \epsilon^2 I$.
(iii) Update process. Set t → t + 1, obtain $\underline{Y}(t)$, and apply
   (1) motion compensation: compute $\hat{Z}^f(t) = F(t)\hat{\underline{Z}}(t-1)$ and
     $\hat{M}^f(t) = F(t)\hat{M}(t-1)F^T(t)$;
   (2) update of the covariance: use (11) to compute the update $\hat{M}(t)$;
   (3) update of the mean: use (12) to compute the update $\underline{\hat{Z}}(t)$.
(iv) Repeat. Update process.

---

Since the update operations are simply based on shifting the previous estimates $\hat{Z}(t-1)$ and $\hat{M}(t-1)$, and updating the proper pixels using $[\hat{M}(t)]_q$ and $[\hat{Z}(t)]_q$ above, hereafter this algorithm is referred to as the dynamic shift-and-add process. Similarly, $\hat{Z}(t)$ is called the dynamic shift-and-add image. Several comments are in order, regarding the above procedure.

(1) Initialization: For long enough sequences, the initialization choice has a vanishing effect on the outcome. Choosing $\hat{M}(0) = \epsilon^2 I$ guarantees that $\hat{M}(t)$ is strictly positive definite at all times, where is an arbitrary large number $\epsilon >> \sigma_w^2$). Better initialization can be proposed, based on interpolation of the image Y(t). The same applies to regions coming from occlusion—those can be initialized by the current image.

(2) Arrays propagated in time: The algorithm propagates two images in time, namely, the image estimate $\hat{Z}(t)$, and the main diagonal of its covariance matrix $\hat{M}(t)$. This last quantity represents the weights assigned per pixel for the temporal fusion process, where the weights are derived from the accumulated measurements for the pixel in question.

The method of data fusion according to the current invention includes causally estimating a state vector at time ($t \geq 1$) from a low-resolution frame at time ($t \geq 1$), followed by choosing a high-resolution frame at time (t=0) and said covariance matrix at time (t=0)=$\epsilon^2 I$, thus ensuring said covariance matrix at time (t) is strictly positive definite at all times. Further, this data fusion process obtains a low-resolution input image by setting t=t+1, applying a motion compensation by computing a forward-shifted matrix at time (t) and a forward shifted covariance matrix at time (t), updating said covariance matrix at time (t), and updating the state vector at time (t), where this process of obtaining the input image is then repeated.

At this point, an efficient recursive estimation algorithm is provided that produces estimates of the blurry high-resolution image sequence $\hat{Z}(t)$. From these frames, the sequence $\hat{X}(t)$ should be estimated. Note that some (if not all) frames will not have estimates for every pixel in $\hat{Z}(t)$, necessitating a further joint interpolation and deblurring step. For the cases of multiframe demosaicing and color super-resolution, the above process is to be applied separately on the R, G, and B layers, producing the arrays to start from in the following discussion.

While the recursive procedure outlined above will produce the optimal (minimum mean-squared) estimate of the state (blurry image $\hat{Z}(t)$) in a causal fashion, the best estimate of the same can also be considered given "all" the frames. This optimal estimate is obtained by a two-way recursive filtering operation known as "smoothing," which is discuss here.

The fast and memory efficient data fusion method described above is suitable for causal, real-time processing, as it estimates the high-resolution frames from the previously seen low-resolution frames. However, oftentimes super-resolution is preformed offline, or non-causally, and therefore a more accurate estimate of a high-resolution frame at a given time is possible by using both previous and future low-resolution frames, where each pilot fused image is derived as an optimal estimate incorporating information from all frames in a sequence using a smoothed approximated pixelwise Kalman filter to obtain an efficient algorithm. An offline dynamic super-resolution method is discussed here, also known as smoothed dynamic super-resolution.

The smoothed data fusion method is a two-pass (forward-backward) algorithm. In the first pass, the low-resolution frames pass through a forward data fusion algorithm similar to the method explained above, resulting in a set of high-resolution estimates (or optimal pilot fused images) $\{\hat{Z}(t)\}_{t=1}^N$ and their corresponding diagonal covariance matrices $\{\hat{M}(t)\}_{t=1}^N$, where the diagonal covariant matrix is applied to the approximated Kalman filter for enhanced processing speed. The second pass runs backward in time using those mean-covariance pairs, and improves these forward high-resolution estimates, resulting in the smoothed mean-covariance pairs $\{\hat{Z}_s(t), \hat{M}_s(t)\}_{t=1}^N$.

While it is possible to simply implement the second pass (backward estimation) similar to the forward Kalman filter algorithm, and obtain the smooth estimate by weighted averaging of the forward and backward estimates with respect to their covariance matrices, computationally more efficient methods are provided according to the current invention. To perform robust deblurring and interpolation, the MAP cost function is used $$\epsilon(X(t)) = \|A(t)(HX(t) - \hat{Z}(t))\|_2^2 + \lambda \Gamma(X(t))$$

and define the desired solution as $$\hat{X}(t) = \underset{X(t)}{\text{ArgMin}} \, \epsilon(X(t))$$

Here, the matrix A(t) is a diagonal matrix whose values are chosen in relation to the confidence in the measurements that contributed to make each element of $\hat{Z}(t)$. These values have an inverse relation to the corresponding elements in the matrix $\hat{M}(t)$. Note that for the smoothed high-resolution estimation cases, $\hat{Z}_s(t)$ and $\hat{M}_s(t)$ substitute for $\hat{Z}(t)$ and $\hat{M}(t)$. The regularization parameter, $\lambda$, is a scalar for properly weighting the first term (data fidelity cost) against the second term (regularization cost), and $\Gamma(X)$ is the regularization cost function. The regularization term provides some prior information about the solution of this illposed problem and stabilizes it, improves the rate of convergence, and helps remove artifacts. Regularization terms are used that yield good results for the case of monochromatic dynamic super-resolution problem and proper regularization terms are addressed below for color super-resolution, and multiframe demosaicing problems, where advanced priors are applied to both spatial and color-wise relationships for high quality recover.

For the case of monochromatic super-resolution, many regularization terms have been proposed. Some have limited applications and are useful for some special types of images (e.g., application of maximum entropy type regularization terms are generally limited to producing sharp reconstructions of point objects). Tikhonov total variation (TV), and bilateral-total variation (BTV) type regularization terms are more generally applicable. While implementation of Tikhonov prior usually results in images with smoothed edges, TV prior tends to preserve edges in reconstruction, as it does not severely penalize steep local gradients.

Based on the spirit of TV criterion and a related technique called the bilateral filter, the BTV regularization is computationally cheap to implement and effectively preserves edges. The bilateral-TV regularization term is defined as $$\Gamma_{BTV}(X(t)) = \sum_{l=-P}^{P}\sum_{m=-P}^{P} \alpha^{|m|+|l|} \|X(t) - S_x^l S_y^m X(t)\|_1$$

$S_x^l$ and $S_y^m$ are the operators corresponding to shifting the image represented by X by l pixels in horizontal direction and m pixels in vertical direction, respectively. This cost function in effect computes derivatives across multiple resolution scales. The scalar weight, $0<\alpha<1$, is applied to give a spatially decaying effect to the summation of the regularization term. Note that image shifting and differencing operations are very cheap to implement. The overall cost function is the summation of the data fidelity penalty term and the regularization penalty term:

$$\hat{X}(t) = \underset{X(t)}{\text{ArgMin}} \left[ \begin{array}{l} \|A(t)(H\underline{X}(t) - \hat{\underline{Z}}(t))\|_2^2 + \\ \lambda \sum_{l=-P}^{P}\sum_{m=-P}^{P} \alpha^{|m|+|l|} \|\underline{X}(t) - S_x^l S_y^m \underline{X}(t)\|_1 \end{array} \right]$$

Steepest descent optimization may be applied to minimize this cost function, which can be expressed as $$\hat{X}_{n+1}(t) = \hat{X}_n(t) + \beta \left\{ H^T A^T(t)(A(t)H\underline{X}(t) - A(t)\hat{\underline{Z}}(t)) + \lambda \sum_{l=-P}^{P}\sum_{m=-P}^{P} \alpha^{|m|+|l|} [I - S_y^{-m} S_x^{-l}] \times \text{sign}(\underline{X}(t) - S_x^l S_y^m \underline{X}(t)) \right\}$$

where $S_x^{-l}$ and $S_y^{-m}$ define the transposes of matrices $S_x^l$ and $S_y^m$, respectively, and have a shifting effect in the opposite directions as $S_x^l$ and $S_y^m$, and $\beta$ is the step size.

In the current invention color sequences are handled in a two-step process of image fusion and simultaneous deblurring and interpolation. Described here first are the fundamentals of the multiframe demosaicing and color super-resolution problems, and then the method of the current invention is described which results in optimal reconstruction of superresolved color images.

Figure 3:
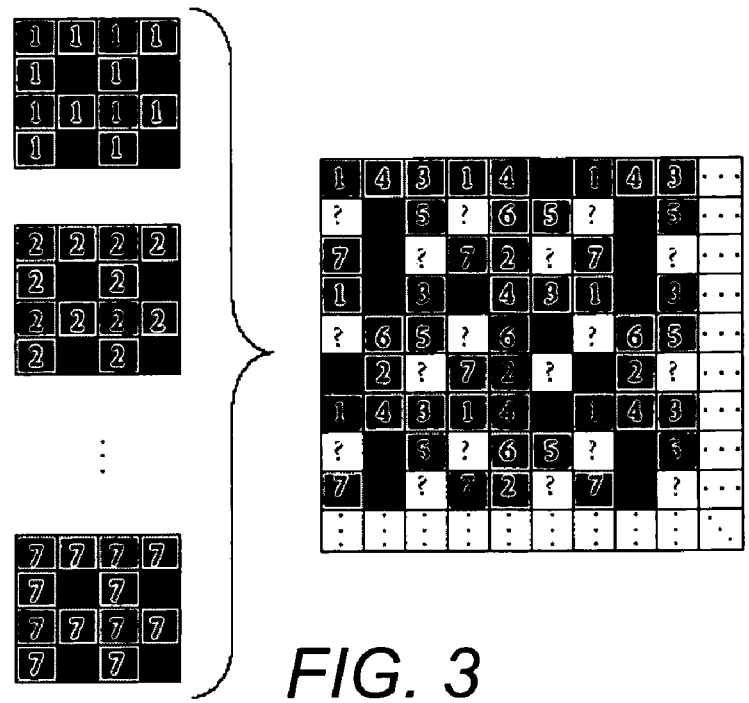
FIG. 3 shows a prior art fusion of 7-Bayer pattern low-resolution images with relative translational motion.

A color image is represented by combining three separate monochromatic images. Ideally, each pixel should correspond to three scalar values; one for each of the color bands (red, green, and blue). In practice, however, to reduce production cost, many digital cameras have only one color measurement per pixel. The detector array is a grid of CCDs, each made sensitive to one color by placing a color filter array (CFA) in front of the CCD. The Bayer pattern shown in FIG. 3 (left) is a very common example of such a color filter. FIG. 3 illustrates the fusion of 7 Bayer pattern low-resolution images with relative translational motion (the figures in the left side of the accolade) results in a high-resolution image ($\hat{Z}$) that does not follow Bayer pattern (the figure in the right side of the accolade). The symbol "?" represents the high-resolution pixel values that were undetermined after the shift-and-add step (result of insufficient low-resolution frames). The values of missing color bands at every pixel are then synthesized using some form of interpolation from neighboring pixel values. This process is known as color demosaicing.

While numerous single-frame demosaicing methods have been proposed, the reconstructed images are almost always contaminated with different amounts of color artifacts. This results from the ill-posed nature of the demosaicing problem. However, if multiple, spatially offset, color-filtered images of the same scene are available, one can combine them both to increase spatial resolution, and to produce a more effective overall demosaicing with significantly reduced artifacts. Such an approach may be termed multiframe demosaicing. What makes multiframe demosaicing challenging is that almost none of the single-frame demosaicing methods are directly applicable to it.

A related problem, color super-resolution, addresses fusing a set of previously demosaiced color low-resolution (or originally full color low-resolution frames) to enhance their spatial resolution. To date, there is very little work addressing the problem of color super-resolution. One possible solution involves applying monochromatic super-resolution algorithms to each of the color channels independently, while using the color information to improve the accuracy of motion estimation. Another approach is transforming the problem to a different color space, where chrominance layers are separated from luminance, and super-resolution is applied only to the luminance channel. Both of these methods are suboptimal as they do not fully exploit the correlation across the color bands.

One aspect of the current invention is a very efficient dynamic method applicable to multiframe demosaicing and also, to the standard color super-resolution problems (where full RGB channels are already available). Referring to the mosaic effects, the geometries of the single-frame and multiframe demosaicing problems are fundamentally different, making it impossible to simply cross-apply traditional demosaicing algorithms to the multiframe situation. To better understand the multiframe demosaicing problem, an example is provided for the case of translational motion. Suppose that a set of color-filtered low-resolution images is available (images on the left in FIG. 3). A static two-step super-resolution process is used to fuse these images. In the first step, low-resolution images are upsampled, motion compensated, and averaged to result in what is termed as the static "shift-and-add" high-resolution image.

The shift-and-add image on the right side of FIG. 3 illustrates the pattern of sensor measurements in the high-resolution image grid. In such situations, the sampling pattern is quite arbitrary depending on the relative motion of the low-resolution images. This necessitates a different demosaicing algorithm than those designed for the original Bayer pattern.

FIG. 3 shows that treating the green channel differently than the red or blue channels, as is done in many singleframe demosaicing methods before, is not particulary useful for the multiframe case. While globally there are more green pixels than blue or red pixels, locally any pixel may be surrounded by only red or blue colors. So, there is no general preference for one color band over the others.

Another assumption, the availability of one and only one color band value for each pixel, is also not correct in the multiframe case. In the underdetermined cases, where the number of non-redundant low-resolution frames is smaller than the square of the resolution enhancement factor, there are not enough measurements to fill the high-resolution grid. The symbol "?" in FIG. 3 represents such pixels. On the other hand, in the overdetermined case, where the number of non-redundant low-resolution frames is larger than the square of the resolution enhancement factor, for some pixels, there may in fact be more than one color value available.

An algorithm is presented below for producing high-quality color sequences from a collection of low-resolution color (filtered) images. In the current invention, a computationally efficient MAP estimation method is motivated by the color image perception properties of the human visual system. This method is directly applicable to both color super-resolution (given full RGB low-resolution frames) and the more general multiframe demosaicing problems introduced earlier.

Figure 4:
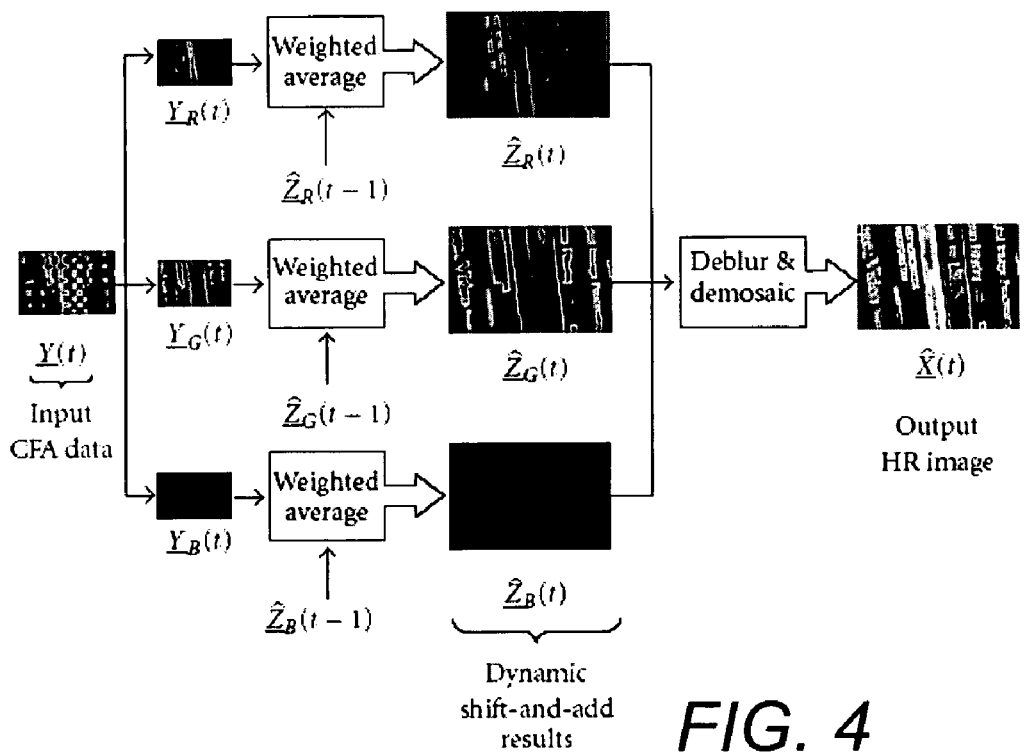
FIG. 4 shows a block diagram representation of the overall dynamic super-resolution process for color filtered images according to the present invention.

As described above, the method according to one aspect of the current invention is a two-step process of image fusion and simultaneous deblurring and interpolation. FIG. 4 shows an overall block diagram of the dynamic super-resolution process for mosaiced images (the feedback loops are eliminated to simplify the diagram). Note that $\hat{Z}_{i \in \{R,G,B\}}(t)$ represents the forward dynamic shift-and-add estimate presented earlier. For the case of color super-resolution, the first step involves nothing more than the application of the recursive image fusion algorithm separately on three different color bands. Image fusion of color-filtered images is done quite similarly, where each single-channel color-filtered frame is treated as a sparsely sampled three-channel color image. The second step (deblur and demosaic block in FIG. 4) is the enhancement step that removes blur, noise, and color artifacts from the shift-and-add sequence, and is based on minimizing a MAP cost function with several terms composing an overall cost function similar to $\epsilon(X(t))$ in $$\epsilon(X(t)) = \|A(t)(HX(t) - \hat{Z}(t))\|_2^2 + \lambda \Gamma(X(t)).$$

In what follows, these terms are defined in this cost function.

Data fidelity penalty term. This term penalizes the dissimilarity between the raw data and the high-resolution estimate, and is defined as $$J_0(\underline{X}(t)) = \sum_{i=R,G,B} \left\|A_i(t)(H\hat{X}_i(t) - \hat{Z}_i(t))\right\|_2^2,$$

where $\hat{Z}_R$, $\hat{Z}_G$, and $\hat{Z}_B$ are the three color channels of the color shift-and-add image, $\hat{Z}$. $A_R$, $A_G$, and $A_B$ are the red, green, and blue diagonal confidence matrices of $\hat{Z}_R$, $\hat{Z}_G$, and $\hat{Z}_B$, respectively. The diagonal elements of $A_{i \in \{R,G,B\}}$ which correspond to those pixels of $\hat{Z}_{i \in \{R,G,B\}}$, which have not been produced from any measurement are set to zero. Note that the $A_{i \in \{R,G,B\}}$ matrices for the multiframe demosaicing problem are sparser than the corresponding matrices in the color super-resolution case. In the current invention, the data fidelity penalty term is an L2 norm penalty term to enforce similarities between the pilot fused image and a high-resolution image estimate.

Luminance penalty term. The human eye is more sensitive to the details in the luminance component of an image than the details in the chrominance components. Therefore, it is important that the edges in the luminance component of the reconstructed high-resolution image look sharp. Applying bilateral-TV regularization to the luminance component will result in this desired property, where an L1 norm is used to force spatial smoothness while creating sharp edges. The luminance image can be calculated as the weighted sum $X_L(t) = 0.299X_R(t) + 0.597X_G(t) + 0.114X_B(t)$. The luminance regularization term is defined:

$$J_1(\underline{X}(t)) = \sum_{l=-P}^{P} \sum_{m=-P}^{P} \alpha^{|m|+|l|} \|\underline{X}_L(t) - S_x^l S_y^m \underline{X}_L(t)\|_1$$

The $S_x^l$ and $S_y^m$ shifting operators and the parameter $\alpha$ are defined in $$\Gamma_{BTV}(\underline{X}(t)) = \sum_{l=-P}^{P} \sum_{m=-P}^{P} \alpha^{|m|+|l|} \|\underline{X}(t) - S_x^l S_y^m \underline{X}(t)\|_1.$$

The current invention uses a spatial luminance penalty term that is a penalty term to encourage sharp edges in a luminance component to the high-resolution image;

Chrominance penalty term. The human eye is more sensitive to chromatic change in the low-spatial-frequency region than the luminance change. As the human eye is less sensitive to the chrominance channel resolution, it can be smoothed more aggressively. Therefore, L2 regularization is an appropriate method for smoothing the Chrominance term:

$$J_2((X(t)) = \|\Lambda X_{C1}(t)\|_2^2 + \|\Lambda X_{C2}(t)\|_2^2,$$

where $\Lambda$ is the matrix realization of a highpass operator such as the Laplacian filter. The images $X_{C1}(t)$ and $X_{C2}(t)$ are the I and Q layers in the YIQ color representation. The current invention uses a spatial chrominance penalty term to encourage smoothness in a chrominance component of said high-resolution image;

Orientation penalty term. This term penalizes the nonhomogeneity of the edge orientation across the color channels. In the current invention an inter-color dependencies penalty term is used to encourage homogeneity of an edge location and orientation in different color bands. Although different bands may have larger or smaller gradient magnitudes at a particular edge, the statistics of natural images shows that it is reasonable to assume a same edge orientation for all color channels. That is, for instance, if an edge appears in the red band at a particular location, then an edge with the same orientation should appear in the other color bands at the same location as well. Minimizing the vector product norm of any two adjacent color pixels forces different bands to have similar edge orientation. With some modifications to what has proposed in other works, the orientation penalty term according to the current invention, is a differentiable cost function:

$$J_3(X(t)) = \sum_{l=-1}^{1} \sum_{m=-P}^{1} \left[ \|X_G(t) \odot S_x^l S_y^m X_B(t) - X_B(t) \odot S_x^l S_y^m X_G(t)\|_2^2 + \right.$$
$$\|X_B(t) \odot S_x^l S_y^m X_R(t) - X_R(t) \odot S_x^l S_y^m X_B(t)\|_2^2 +$$
$$\left. \|X_R(t) \odot S_x^l S_y^m X_G(t) - X_G(t) \odot S_x^l S_y^m X_R(t)\|_2^2 \right]$$

where $\odot$ is the element-by-element multiplication operator. The overall cost function to $\epsilon(X(t))$ is the summation of these cost functions:

$$\hat{X}(t) = \underset{X(t)}{\mathrm{ArgMin}}[J_0(X(t)) + \lambda' J_1(X(t)) + \lambda'' J_2(X(t)) + \lambda''' J_3(X(t))]$$

Coordinatewise steepest descent optimization may be applied to minimize this cost function $\hat{X}(t)$. In the first step, the derivative of this overall cost function $\hat{X}(t)$ with respect to one of the color bands is calculated, assuming the other two color bands are fixed. In the next steps, the derivative is computed with respect to the other color channels.

Experiments on synthetic and real data sets are provided to demonstrate the aspects of the current invention. In the first experiment, a sequence of low-resolution color-filtered images are synthesized from a single color image of size 1200×1600 captured with a one-CCD OLYMPUS C-4000 digital camera. A 128×128 section of this image was blurred with a symmetric Gaussian lowpass filter of size 4×4 pixels with standard deviation equal to one. The resulting images were subsampled by the factor of four in each direction and further color filtered with Bayer pattern creating a 32×32 image. Gaussian noise was added to the resulting low-resolution frames to achieve SNR equal to 30 dB, where the SNR is defined as $10 \log_{10} (\sigma^2/\sigma_n^2)$, where $\sigma^2$ and $\sigma_n^2$ are variances of a clean frame and noise, respectively The 128×128 window was consecutively shifted on the original high-resolution image by one pixel in right, down, or up directions, and repeated the same image degradation process. In this fashion, we created a sequence of 250 frames.

In FIG. 5(a) and FIG. 5(b), the ground truth is shown for frames #50 and #250 that show two sections of the high-resolution image. FIG. 5(c) and FIG. 5(d) are the corresponding synthesized low-resolution frames that show frames #50 and #250 of the low-resolution sequence (for the sake of presentation each frame has been demosaiced following known methods). A sequence of high-resolution fused images was created using the method described above (factor of 4 resolution enhancement by forward shift-and-add method). FIG. 5(e) and FIG. 5(f) show frames #50 and #250 of this sequence, where the missing values were filled in using bilinear interpolation. Note that for the particular motion in this underdetermined experiment, it is easy to show that less than ⅓ of the pixel values in $\hat{Z}(t)$ are determined by the shift-and-add process. Later each frame was deblurred-demosaiced using the method described above. FIGS. 5(g) and 5(h) show frames #50 and #250 of this reconstructed sequence, where the color artifacts have been almost completely removed.

Figure 5:
FIGS. 5a-5h show experimental results of a synthesized frame sequence using image fusion, deblurred and demosaiced according to the present invention.
Figure 5:
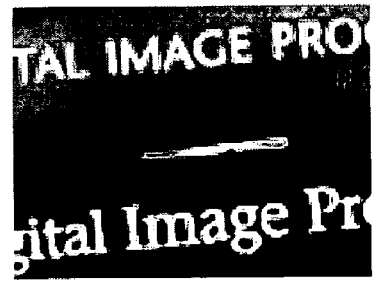
Figure 5:
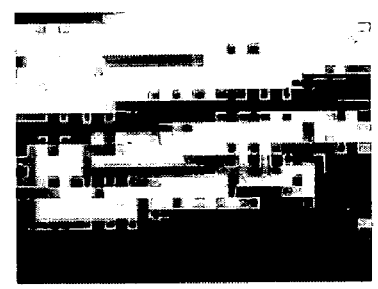
Figure 5:
Figure 5:
Figure 5:
Figure 5:
Figure 5:
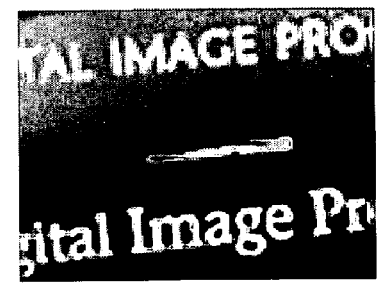
Figure 6:
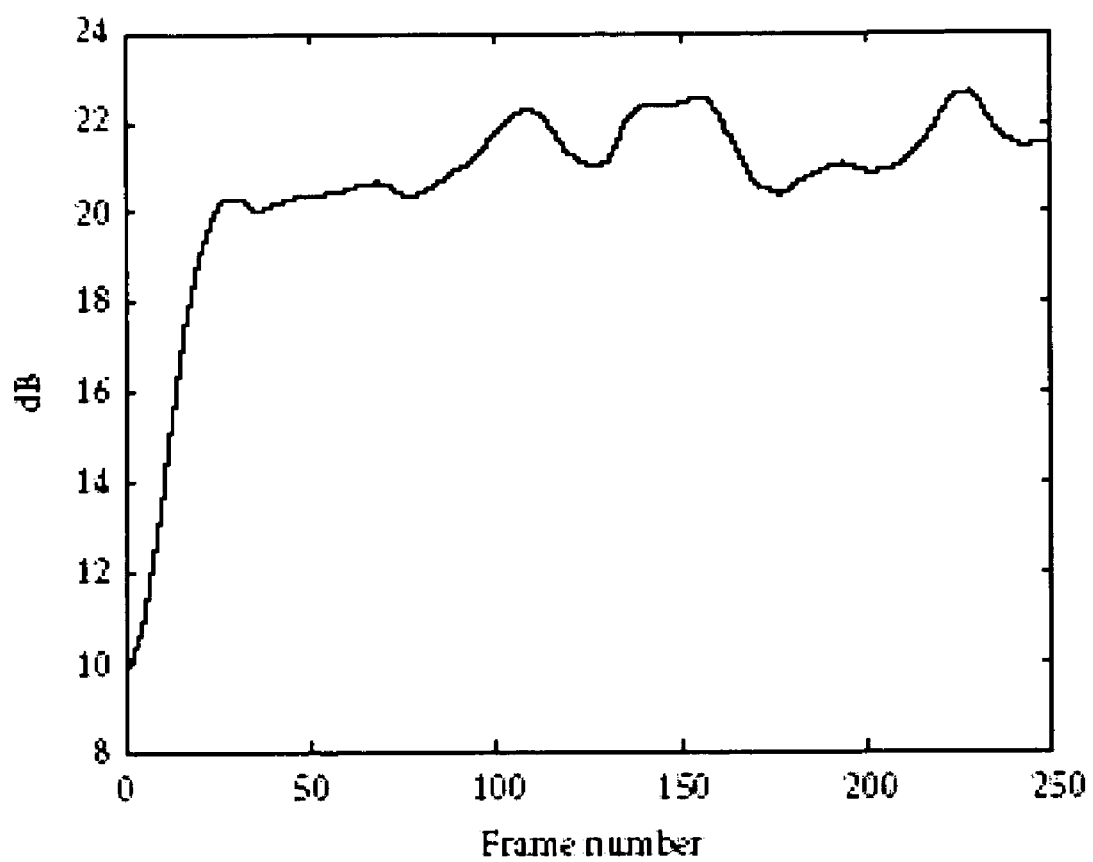
FIG. 6 shows a plot of peak signal to noise ratio of the synthesized frame sequence of the experiment in FIG. 5 according to the present invention.

The peak signal to noise ratio (PSNR) values for the sequence of FIG. 5 are plotted in FIG. 6. The PSNR of two vectors X and $\hat{X}$ of size $[3r^2Q_1Q_2 \times 1]$ is defined as PSNR $$(X, \hat{X}) = 10 \log_{10}((255^2 \times 3 r^2 Q_1 Q_2) / \|X - \hat{X}\|_2^2)$$

The plot of FIG. 6 shows that after the first few frames are processed, the quality of the reconstruction is stabilized for the remaining frames. The small distortions in the PSNR values of this sequence are due to the difference in color and high-frequency information of different frames. The corresponding parameters for this experiment (tuned by trial-and-error) were as follows: $\alpha=0.9$, $=106$, $\beta=0.06$, $\lambda'=\lambda''=0.001$, and $\lambda=10$. Fifteen iterations of steepest descent were used for this experiment.

Figure 7:
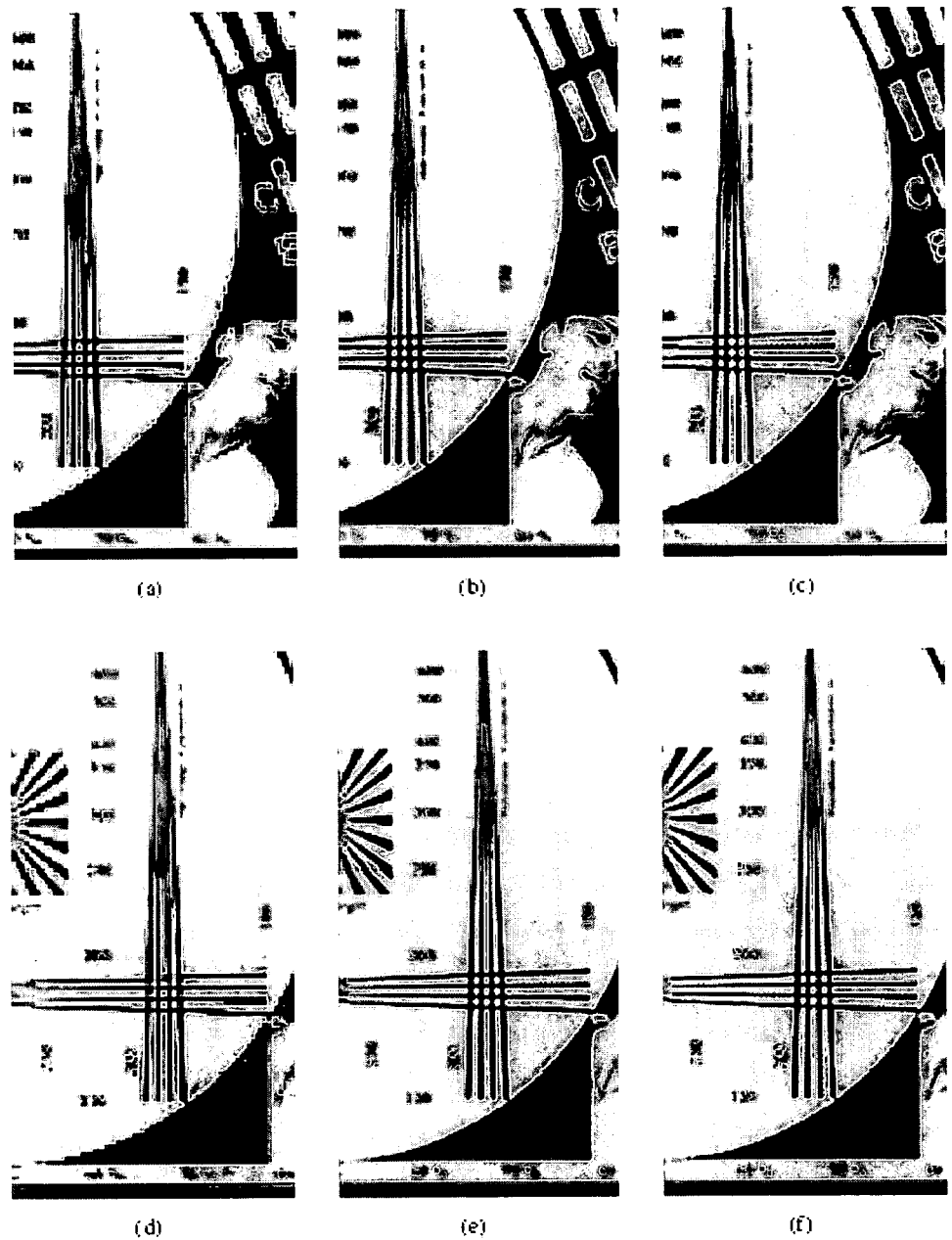
FIGS. 7a-7f show experimental results of a real-world frame sequence using image fusion, deblurred and demosaiced according to the present invention.

The second experiment was preformed on a real-world (already demosaiced) compressed image sequence courtesy of Adyoron Intelligent Systems Ltd., Tel Aviv, Israel. Two frames of this sequence (frames #20 and #40) are shown in FIGS. 7(a) and 7(d). A sequence of high-resolution fused images (factor of 4 resolution enhancement) was created using the forward data fusion method described above (FIGS. 7(b) and 7(e)). Later each frame in this sequence was deblurred using the method described above (FIGS. 7(c) and 7(f)). The corresponding parameters for this experiment are as follows: $\alpha=0.9$, $=106$, $\beta=0.1$, $\lambda'=\lambda''=0.005$, and $\lambda=50$. Fifteen iterations of steepest descent were used for this experiment. The (unknown) camera PSF was assumed to be a 4×4 Gaussian kernel with standard deviation equal to one. As the relative motion between these images approximately followed the translational model, it was only needed to estimate the motion between the luminance components of these images. Methods known in the art were used to compute the motion vectors. In the reconstructed images, there are some effects of wrong motion estimation, seen as periodic teeth along the vertical bars. It was assumed that these errors correspond to the small deviations from the pure translational model.

Figure 8:
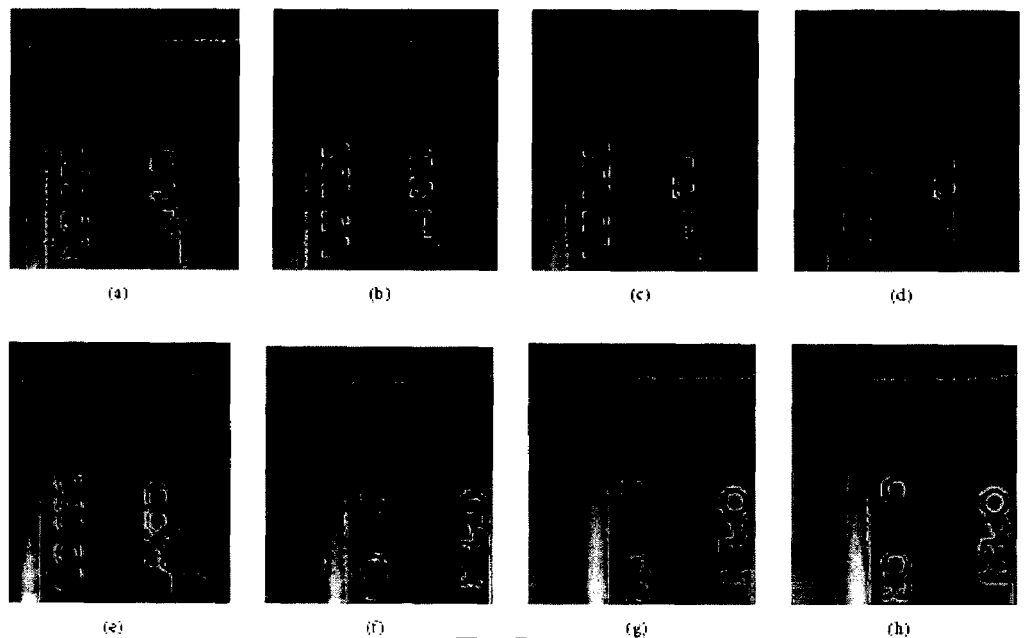
FIG. 8a-8h show experimental results of a real-world frame sequence using image fusion, deblurred and demosaiced according to the present invention.

In a third experiment, 74 uncompressed, raw CFA images from a video camera (based on Zoran 2MP CMOS sensors) were used. Methods known in the art were used to demosaic each of these low-resolution frames, individually. FIG. 8(a) shows frame #1 of this sequence. To increase the spatial resolution by a factor of three, the proposed forward data fusion method above was applied on the raw CFA data. FIG. 8(b) shows the forward shift-and-add result. This frame was further deblurred demosaiced by the method explained above and the result is shown in FIG. 8(c). To enhance the quality of reconstruction, the smoothing method described above was applied to this sequence. FIG. 8(d) shows the smoothed data fusion result for frame #1 (smoothed shift-and-add). The deblurred-demosaiced result of applying the method explained above is shown in FIG. 8(e). FIG. 8(f) shows the frame #69 of this sequence, demosaiced by method known in the art. FIG. 8(g) shows the result of applying the method of described above to form the smoothed shift-and-add image. This frame is further deblurred-demosaiced by the method according to the current invention explained above and the result is shown in FIG. 8(h). The parameters used for this experiment are as follows: $\beta=0.04$, =106, $\alpha=0.9$, $\lambda=0.001$, $\lambda=50$, $\lambda=0.1$. The (unknown) camera PSF was assumed to be a tapered 5×5 disk PSF.

Note that $F(t)X(t-1)$ is a suitable candidate to initialize $\hat{X}^0(t)$, since it follows the Kalman filter prediction of the state-vector updates. Therefore, as the deblurring-demosaicing step is the computationally expensive part of this algorithm, for all of these experiments the shifted version of deblurred image of $t-1$ was used as the initial estimate of the deblurred-demosaiced image at time instant $t$.

The following discussion explains and formulates the two-pass fixed-interval smoothing method of Rauch, Tung, and Striebel as applied to the dynamic super-resolution problem according to the current invention. The first pass is quite similar to the method explained earlier above, resulting in a set of high-resolution estimates $\{\hat{Z}(t)\}_{t=1}^N$ and their corresponding diagonal covariance matrices $\{\hat{M}(t)\}_{t=1}^N$. The second pass runs backward in time using those mean-covariance pairs, and improves these forward high-resolution estimates.

The following equations define the high-resolution image and covariance updates in the second pass. Assuming that the entire sequence $\{\hat{Z}(t),\hat{M}(t)\}_{t=1}^N$ is given, it is desired to estimate the pairs $\{\hat{Z}_s(t),\hat{M}_s(t)\}_{t=1}^N$ that represent the mean and covariance per time $t$, based on all the information in the sequence. Here, a process is assumed that runs from $t=N-1$ downwards, initialized with $\hat{Z}_s(N)=\hat{Z}(N)$ and $\hat{M}_s(N)=\hat{M}(N)$.

Beginning with the covariance propagation matrix. Notice its similarity to $$\tilde{M}(t)=F(t)\hat{M}(t-1)F^T(t)+C_v(t)$$

giving $$\tilde{M}(t+1)=F(t+1)\hat{M}(t)F^T(t+1)+C_v(t+1)$$

This equation builds a prediction of the covariance matrix for time $t+1$, based on the first-pass forward stage. Note that the outcome is diagonal as well.

The Kalman smoothed gain matrix is computed using the above prediction matrix, and the original forward covariance one, by $$K_s(t)=\hat{M}(t)F^T(t+1)[\tilde{M}(t+1)]^{-1}$$

This gain will be used both for the backward updates of the mean and the covariance, $$\hat{Z}_s(t)=\hat{Z}(t)+K_s(t)[\hat{Z}_s(t+1)-F(t+1)\hat{Z}(t)]$$

where the term $\hat{Z}_s(t+1)-F(t+1)\hat{Z}(t)$ could be interpreted as a prediction error. The smoothed covariance matrix is updated by $$\hat{M}_s(t)=Cov(\hat{Z}_s(t))=\hat{M}(t)+K_s(t)[\hat{M}_s(t+1)-\tilde{M}(t+1)]K_s^T(t).$$

Following the notations before above, the superscript "b" is used to represent backward shifting in time of vectors and matrices, so that $\hat{Z}_s^b(t)=F^T(t+1)\hat{Z}_s(t+1)$ and similarly $\hat{M}_s^b(t)=F^T(t+1)\hat{M}_s(t+1)F(t+1)$ and $C_v^b(t)=F^T(t+1)C_v(t+1)F(t+1)$. Then, using the same rational practiced in the forward algorithm, the smoothed gain matrix for a pixel at spatial position $q$ is $$\frac{[\hat{M}(t)]_q}{[\hat{M}(t)]_q+[C_v^b(t)]_q}$$

These equations can simplified to the following pixelwise update formulas:

$$[\hat{M}_s(t)]_q = [\hat{M}(t)]_q + [\hat{M}(t)]_q^2 \times \frac{[\hat{M}_s^b(t)]_q - [\hat{M}(t)]_q - [C_v^b(t)]_q}{[\hat{M}(t)]_q + [C_v^b(t)]_q}$$

$$[\hat{Z}_s(t)]_q = \frac{[C_v^b(t)]_q[\hat{Z}(t)]_q + [\hat{M}(t)]_q[\hat{Z}_s^b(t)]_q}{[\hat{M}(t)]_q + [C_v^b(t)]_q}$$

Figure 9:
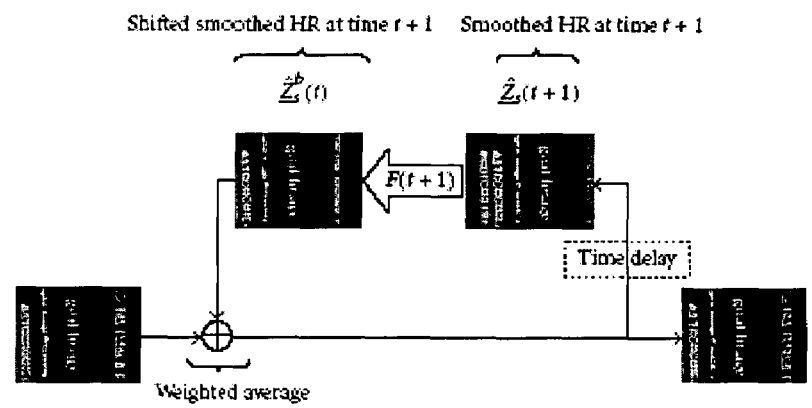
FIG. 9 shows a block diagram representation a smoothed high-resolution output frame of a weighted average of an optimal pilot fused image, a forward Kalman high-resolution estimate and a previous smoothed estimate of the high-resolution image, after motion compensation according to the present invention.

FIG. 9 describes the above equation as a block diagram.

There is a simple interpretation for $[\hat{Z}_s(t)]_q$ above. The smoothed high-resolution pixel at time $t$ is the weighted average of the forward high-resolution estimate at time $t$ ($[\hat{Z}_s(t)]_q$) and the smoothed high-resolution pixel at time instant $t+1$ after motion compensation ($[\hat{Z}_s^b(t)]_q$). In case there is high confidence in the $[\hat{Z}(t)]_q$ (i.e., the value of $[\hat{M}(t)]_q$ is small), the weight of $[\hat{Z}_s^b(t)]_q$ will be small. On the other hand, if there is high confidence in estimating the high-resolution pixel at time $t+1$ from an high-resolution pixel at time $t$ after proper motion compensation (i.e., the value of $[C_v^b(t)]_q$ is small), it is reasonable to assume that the smoothed high-resolution pixel at time $t$ can be estimated from a high-resolution pixel at time $t+1$ after proper motion compensation. Note that unlike the forward pass, estimation of high-resolution smoothed images do not depend on the computation of smoothed covariance update matrices as in $$\hat{M}_s(t) = Cov(\hat{Z}_s(t)) = \hat{M}(t) + K_s(t)[\hat{M}_s(t+1) - \tilde{M}(t+1)]K_s^T(t)$$

and $$[\hat{M}_s(t)]_q = [\hat{M}(t)]_q + [\hat{M}(t)]_q^2 \times \frac{[\hat{M}_s^b(t)]_q - [\hat{M}(t)]_q - [C_v^b(t)]_q}{[\hat{M}(t)]_q + [C_v^b(t)]_q},$$

and those can be ignored in the application.

The overall procedure using these update equations is outlined in Algorithm 2 below.

---

ALGORITHM 2: Smoothed dynamic shift-and-add algorithm.

(i) Task. Given $\{\underline{Y}(t)\}_{t\geq 1}$, estimate $\{\underline{Z}(t)\}_{t\geq 1}$ noncausally.
(ii) First Pass. Assume that the causal algorithm has been applied, giving the sequence $\{\hat{Z}(t), \hat{M}(t)\}_{t=1}^N$.
(iii) Initialization. Set $t = N$, choose $\hat{\underline{Z}}_s(t) = \hat{\underline{Z}}(t)$ and $\hat{M}_s(t) = \hat{M}(t)$.
(iv) Update process. Set $t \to t - 1$ and apply
  (1) motion compensation: compute $\hat{\underline{Z}}_s^b(t) = F^T(t + 1)\hat{\underline{Z}}_s(t + 1)$ and $\hat{M}_s^b(t) = F^T(t + 1)\hat{M}_s(t + 1)F(t + 1)$;
  (2) update of the covariance: use (A.6) to compute the update $\hat{M}_s(t)$;
  (3) update of the mean: use (A.7) to compute the update $\hat{\underline{Z}}_s(t)$.
(v) Repeat. Update process.

---

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example we note that although the proposed method is derived based on translational motion, and space invariant blur model assumptions it is directly applicable to virtually any more general motion and blur models. Although, in that case the quality of reconstructed images will not be optimal, yet the computational and memory efficiency gained justify the using the proposed algorithm for such more general cases. All such variations are considered to be within the scope and spirit of the present invention as defined by the following claims and their legal equivalents.

What is claimed is:

1. A method of video-to-video dynamic super-resolution for reducing memory requirements and enhancing processing speed, color and resolution for grayscale and color sequences comprising:
    a. using super-resolution, deblurring, and demosaicing simultaneously to incorporate color measurements encountered in video sequences;
    b. using a pixel-wise mean-covariance approximate of a Kalman filter for an optimal pilot fused image on a high resolution grid;
    c. applying advanced priors to both spatial and color-wise relationships for high quality recovery; and
    d. using a non-causal process mode, wherein each said pilot fused image is derived as an optimal estimate incorporating information from all frames in a sequence using smoothed said approximated pixelwise Kalman filter to obtain an efficient algorithm.

2. The method of claim 1, wherein a diagonal covariant matrix is applied to said approximated Kalman filter for enhanced processing speed.

3. The method of claim 1, wherein said data fusion comprises:
    a. causally estimating a state vector at time ($t \geq 1$) from a low-resolution frame at time ($t \geq 1$);
    b. choosing a high-resolution frame at time ($t=0$) and said covariance matrix at time ($t=0$)=$\epsilon^2 I$, whereby ensuring said covariance matrix at time (t) is strictly positive definite at all times;
    c. obtaining a low-resolution input image by:
        i. setting $t=t+1$;
        ii. applying a motion compensation by computing a forward-shifted matrix at time (t) and a forward shifted covariance matrix at time (t);
        iii. updating said covariance matrix at time (t);
        iv. updating said state vector at time (t); and
    d. repeating step c.

4. The method of claim 1, wherein said image interpolation, deblurring, and demosaicing comprise:
    a. using a data fidelity penalty term, wherein said data fidelity penalty term is an L2 norm penalty term to enforce similarities between said pilot fused image and a high-resolution image estimate;
    b. using a spatial luminance penalty term, wherein said spatial luminance penalty term is a penalty term to encourage sharp edges in a luminance component to said high-resolution image;
    c. using a spatial chrominance penalty term, wherein said spatial chrominance penalty term is a term to encourage smoothness in a chrominance component of said high-resolution image; and
    d. using an inter-color dependencies penalty term, wherein said inter-color dependencies penalty term is a term to encourage homogeneity of an edge location and orientation in different color bands.

5. The method according to claim 1, wherein said lower-resolution color images comprise color filtered images, compressed color images, compressed color filtered images, and an image sequence with color artifacts.

* * * * *